United States Patent
McKay et al.

(10) Patent No.: US 10,680,253 B2
(45) Date of Patent: Jun. 9, 2020

(54) ELECTROCHEMICAL POWER SYSTEM USING AQUEOUS DISSOLVED OXYGEN

(71) Applicant: L3 Open Water Power, Inc., Somerville, MA (US)

(72) Inventors: Ian Salmon McKay, Seattle, WA (US); Jason R Kovacs, Somerville, MA (US); Jesse Daniel Benck, Cambridge, MA (US); Branko Zugic, Somerville, MA (US)

(73) Assignee: L3 Open Water Power, Inc., Somerville, MA (US)

(*) Notice: Subject to any disclaimer, the term of this patent is extended or adjusted under 35 U.S.C. 154(b) by 0 days.

(21) Appl. No.: 16/611,848

(22) PCT Filed: Jul. 12, 2018

(86) PCT No.: PCT/US2018/041869
§ 371 (c)(1),
(2) Date: Nov. 7, 2019

(87) PCT Pub. No.: WO2019/014474
PCT Pub. Date: Jan. 17, 2019

(65) Prior Publication Data
US 2020/0075965 A1    Mar. 5, 2020

Related U.S. Application Data

(60) Provisional application No. 62/531,418, filed on Jul. 12, 2017.

(51) Int. Cl.
*H01M 6/34* (2006.01)
*C01B 13/02* (2006.01)
(Continued)

(52) U.S. Cl.
CPC .......... *H01M 6/34* (2013.01); *C01B 13/0255* (2013.01); *H01M 2/40* (2013.01); *H01M 4/38* (2013.01); *H01M 12/06* (2013.01)

(58) Field of Classification Search
CPC ............ H01M 6/34; H01M 2/30; H01M 4/38; H01M 12/06; C01B 13/0255
(Continued)

(56) References Cited

U.S. PATENT DOCUMENTS

| | | | |
|---|---|---|---|
| 4,761,209 A | 8/1988 | Bonaventura et al. | |
| 4,822,698 A | * 4/1989 | Jackovitz | H01M 4/46 429/118 |

(Continued)

OTHER PUBLICATIONS

Kim, et al. "Rechargeable Seawater Battery and Its Electrochemical Mechanism" ChemElectroChem 2015, 2, 328-332 (2015).
(Continued)

*Primary Examiner* — Sean P Cullen
(74) *Attorney, Agent, or Firm* — Danielson Legal LLC; Jordana R. Goodman

(57) ABSTRACT

A method of generating an electrical current and a multi-cell electrochemical device. The method includes extracting oxygen from an aqueous ambient environment surrounding an electrochemical system; transporting the extracted oxygen through a selectively oxygen-permeable membrane to an enclosed electrolyte configured to surround an anode and a cathode in the electrochemical system, wherein the electrolyte is separated from the aqueous ambient environment; transporting the oxygenated electrolyte to the cathode; reducing the oxygen at the cathode; and oxidizing a metal at the anode. The device includes a metal anode; a cathode; an enclosed electrolyte configured to surround the cathode and the anode, wherein the electrolyte is separated from an aqueous ambient environment surrounding the electro-
(Continued)

chemical device; and a selectively oxygen-permeable membrane configured to extract oxygen from the aqueous ambient environment.

20 Claims, 10 Drawing Sheets

(51) Int. Cl.
*H01M 2/40* (2006.01)
*H01M 4/38* (2006.01)
*H01M 12/06* (2006.01)

(58) Field of Classification Search
USPC .......................................................... 429/119
See application file for complete search history.

(56) References Cited

U.S. PATENT DOCUMENTS

| | | | | |
|---|---|---|---|---|
| 5,225,291 | A * | 7/1993 | Rao | H01M 6/26 |
| | | | | 429/118 |
| 5,405,717 | A * | 4/1995 | Hasvold | H01M 6/34 |
| | | | | 429/119 |
| 5,985,475 | A | 11/1999 | Reynolds et al. | |
| 2012/0040274 | A1 * | 2/2012 | Gordon | H01M 2/1264 |
| | | | | 429/499 |
| 2013/0309581 | A1 * | 11/2013 | Yamaguchi | H01M 12/06 |
| | | | | 429/403 |
| 2015/0010833 | A1 | 1/2015 | Amendola et al. | |
| 2015/0125763 | A1 * | 5/2015 | Zheng | H01M 2/40 |
| | | | | 429/405 |
| 2017/0237106 | A1 * | 8/2017 | Wang | H01M 4/134 |
| | | | | 429/405 |

OTHER PUBLICATIONS

Crowther, et al., "Oxygen Selective Membranes for Li-Air (O2) Batteries" Membranes 2012, 2, 216-227 (2012).
Read, et al. "Oxygen Transport Properties of Organic Electrolytes and Performance of Lithium-Oxygen Battery" J. Electrocehm. Soc., 2003, 150(10), A1351-A1356 (2003).
Written Opinion of the International Searching Authority for PCT/US2018/041869, dated Nov. 2, 2018, 6 pages.
International search report for PCT/US2018/041869, dated Nov. 2, 2018, 2 pages.
Written opinion of the ISA for PCT/US2018/041869, dated Nov. 2, 2018, 6 pages.

* cited by examiner

ELECTROCHEMICAL POWER SYSTEM USING AQUEOUS DISSOLVED OXYGEN

CROSS REFERENCE TO RELATED APPLICATIONS

The present application claims priority to U.S. provisional application No. 62/531,418, filed on Jul. 12, 2017, the entire disclosure of which is hereby incorporated by reference as if set forth in its entirety herein.

TECHNICAL FIELD

This invention generally relates to systems and methods for extracting oxygen from an aqueous ambient environment and, more particularly, to systems and methods of generating an electrical current using the extracted oxygen.

BACKGROUND

A battery converts the chemical energy of active materials into electrical energy by means of an electrochemical oxidation-reduction reaction. A battery includes an electrolyte, a cathode, and an anode. Water-activated metal batteries (such as $Li-H_2O$, $Na-H_2O$, $Al-H_2O$, and $Mg-H_2O$ galvanic cells)[1] oxidize a metal at the anode (negative electrode) and reduce water at a cathode (positive electrode). These systems in general could achieve much higher energy storage densities if there were a way to continuously extract dissolved oxygen from seawater, and to transfer this oxygen to the battery electrolyte to be used as an oxidant in the place of water.

[1] "X-Y battery" is a battery in which species X is oxidized, and species Y is reduced during galvanic discharge. For example, a metal-dissolved oxygen battery is a battery in which the metal is oxidized and dissolved oxygen is reduced during galvanic discharge.

| Reactive metal anode | Theoretical energy density using $H_2O$ as oxidizing agent (MJ/L) | Theoretical energy density using dissolved $O_2$ as oxidizing agent (MJ/L) |
| --- | --- | --- |
| Li | 22 | 31 |
| Mg | 33 | 50 |
| Al | 48 | 84 |

As shown in the above table, seawater-activated $Al-H_2O$ power systems could offer nearly two times their presently-attainable energy density if they were able to reduce the $O_2$ dissolved in seawater, rather than if the $Al-H_2O$ power systems reduced only the seawater itself.

Alternately, a system capable of transferring dissolved $O_2$ from seawater into the electrolyte of a metal-air battery (such as $Li-O_2$, $Na-O_2$, $Al-O_2$, $Zn-O_2$ and $Mg-O_2$ galvanic cells) could allow these batteries to function in ocean environments, whereas they are now restricted to operate only in environments with a ready supply of gaseous oxygen.

Prior batteries that oxidize reactive metals, and reduce the oxygen dissolved in seawater, have operated without self-contained electrolytes i.e. at least one of the components of the electrochemical cell, including at least one of the cathode, anode, and electrolyte are open to seawater and are not separated by any barrier to the surrounding environment. In some prior batteries, the electrochemical cell uses the ocean as the electrolyte. This configuration allows these batteries to reduce the $O_2$ present in seawater at low rates. However, without a contained electrolyte, the batteries suffer from high internal resistances, and are prone to biofouling and calcareous deposits on their positive electrodes. Additionally, such battery systems must operate at very low voltages (often a single cell), as series combinations of cells for higher voltages will result in shunt losses between cells though the shared electrolyte.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter The present disclosure is related to systems and methods for extracting oxygen from an aqueous ambient environment and, more particularly, to systems and methods of generating an electrical current using the extracted oxygen. The subject matter of the present invention involves, in some cases, interrelated products, alternative solutions to a particular problem, and/or a plurality of different uses of one or more systems and/or articles.

In one aspect, embodiments relate to a method of generating an electrical current. The method includes extracting oxygen from an aqueous ambient environment surrounding an electrochemical system; transporting the extracted oxygen through a selectively oxygen-permeable membrane to an enclosed electrolyte configured to surround an anode and a cathode in the electrochemical system, wherein the electrolyte is separated from the aqueous ambient environment; transporting the oxygenated electrolyte to the cathode; reducing the oxygen at the cathode; and oxidizing a metal at the anode.

In one embodiment, the electrolyte has a pH above 7.40.

In one embodiment, the method further includes extracting metal-hydroxide waste from the electrolyte.

In one embodiment, the membrane is salt-selective.

In one embodiment, the anode comprises at least one of Li, Mg, Na, Zn, and Al.

In one embodiment, the system comprises a plurality of selectively oxygen-permeable membranes.

In one embodiment, the aqueous ambient environment comprises seawater.

In one embodiment, a pump actively transports the oxygenated electrolyte to the cathode.

In one embodiment, the oxygenated electrolyte is passively transported to the cathode.

In another aspect, embodiments relate to a multi-cell metal-dissolved oxygen electrochemical device. The device includes a metal anode; a cathode; an enclosed electrolyte configured to surround the cathode and the anode, wherein the electrolyte is separated from an aqueous ambient environment surrounding the electrochemical device; and a selectively oxygen-permeable membrane configured to extract oxygen from the aqueous ambient environment; wherein the electrochemical device is configured to: transport the oxygen to the electrolyte; transport the oxygenated electrolyte to the cathode; reduce the oxygen at the cathode; oxidize a metal at the metal anode; and generate an electrical current.

In one embodiment, the electrolyte has a pH above 7.40.

In one embodiment, the membrane is salt-selective.

In one embodiment, the anode comprises at least one of Li, Mg, Na, Zn, and Al.

In one embodiment, the device further includes a plurality of selectively oxygen-permeable membranes.

In one embodiment, the aqueous ambient environment includes seawater.

In one embodiment, the device includes a pump configured to actively transport the oxygenated electrolyte to the cathode.

In one embodiment, the oxygenated electrolyte is passively transported to the cathode.

In one embodiment, the cells are arranged electrically in series.

In one embodiment, the cells are arranged fluidically in parallel.

In yet another aspect, embodiments relate to a multi-cell electrochemical device. The device includes a metal anode; a cathode; an enclosed electrolyte configured to surround the cathode and the anode, wherein: the electrolyte is separated from an aqueous ambient environment surrounding the electrochemical device, and the electrolyte comprises an anolyte and a catholyte; a selectively oxygen-permeable membrane configured to extract oxygen from the aqueous ambient environment; and an anolyte flow loop separate from a catholyte flow loop, wherein the electrochemical device is configured to: transport the oxygen to the catholyte; transport the oxygenated catholyte to the cathode; reduce the oxygen at the cathode; oxidize a metal at the metal anode; and generate an electrical current.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
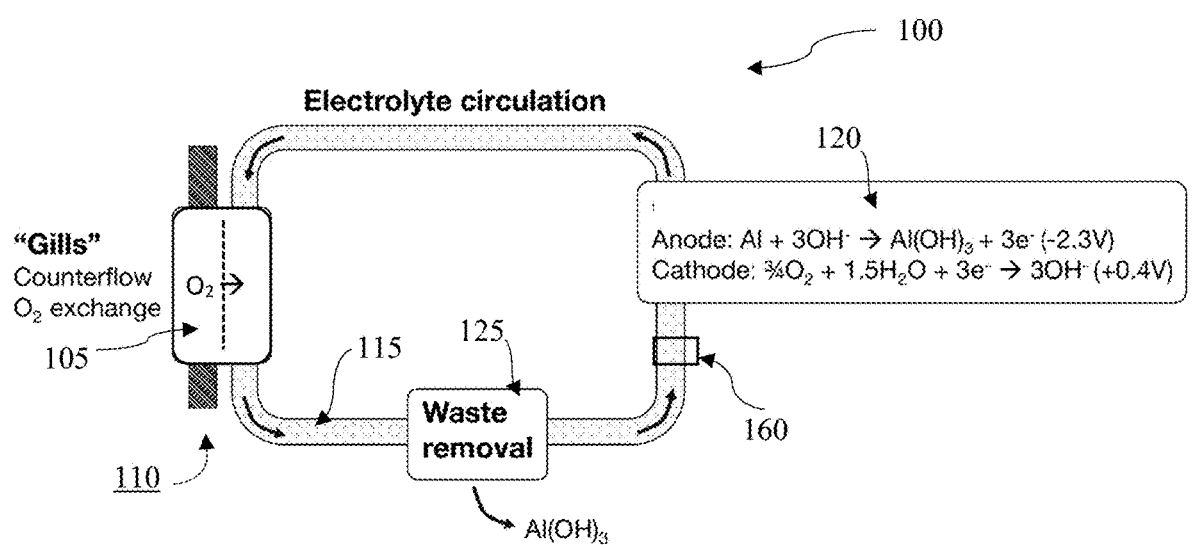
FIG. 1 is a schematic diagram of an aluminum-based battery with a gill subunit, in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments described herein scavenge $O_2$ gas dissolved in an aqueous environment, such as seawater, and supply the $O_2$ into the battery electrolyte for use as an oxidizing agent. Combined with modification to the battery electrolyte and operating parameters, the inclusion of this scavenging subsystem significantly increases the energy density of metal-dissolved oxygen batteries in some embodiments. Furthermore, in some embodiments, this scavenging subsystem may allow metal-air batteries to operate in underwater environments.

Some embodiments include a set of artificial 'gills' that comprise a manifold or array of $O_2$ permeable membranes. This 'gill' subunit may be placed in the internal flow of electrolyte in a battery with a reactive metal (Li, Na, Mg, Zn, Al, or alloys or any combination thereof) anode(s) in some embodiments. In some embodiments, the electrochemical cell may use an anode comprising a reactive metal, including metals selected from Groups 1A and 2A of the Periodic Table, alloys, or any combinations thereof. A parallel flow, cross-flow, or counterflow arrangement between an aqueous ambient environment on one side of the membranes, and the electrolyte of the electrochemical cell on the other side of the membranes, may facilitate the transport of dissolved $O_2$ from seawater into the battery electrolyte without allowing significant transport of dissolved species in either direction across the membrane. In some embodiments, a counterflow or cross-flow arrangement between an aqueous environment on one side of the membranes and the electrolyte of the electrochemical cell on the other side of the membranes may facilitate a larger transport of dissolved $O_2$ into the battery electrolyte over a set period of time than a parallel flow. Once in the battery electrolyte, the oxygen species may be carried along an electrolyte flow loop to the cathode(s) of the battery, where they are reduced.

In some embodiments, the membranes may be arranged in a high surface area configuration that facilitates the maximum throughput of oxygen, much like the lamellae in the gills of a shark. In some embodiments, once the system is deployed, the gill subunit may expand, unfurl or unfold into the sea or other aqueous environment in order to maximize the mass transfer surface area. The membranes may be arranged in tubes or channels and may enable a crossflow or counterflow arrangement between the battery electrolyte and the aqueous ambient environment in some embodiments. In some embodiments, the battery electrolyte may comprise a separate catholyte and anolyte. In some embodiments, the membranes may enable a crossflow or counterflow arrangement between the battery catholyte and the aqueous ambient environment. The membranes may be nonpolar small-pore membranes or polymer composite membranes in some embodiments. The membranes may comprise silicone rubber, polytetrafluoroethylene or other fluoropolymers (with or without sulfonyl group substitutions), an alkylcellulose, an acetylcellulose, polysulfone, polyamide, polypropylene, polyethylene, polyethersulfone, polybenzimidazolone, or a combination thereof. In some embodiments, the membranes may comprise zeolites, clays, or a combination thereof.

Figure 5:
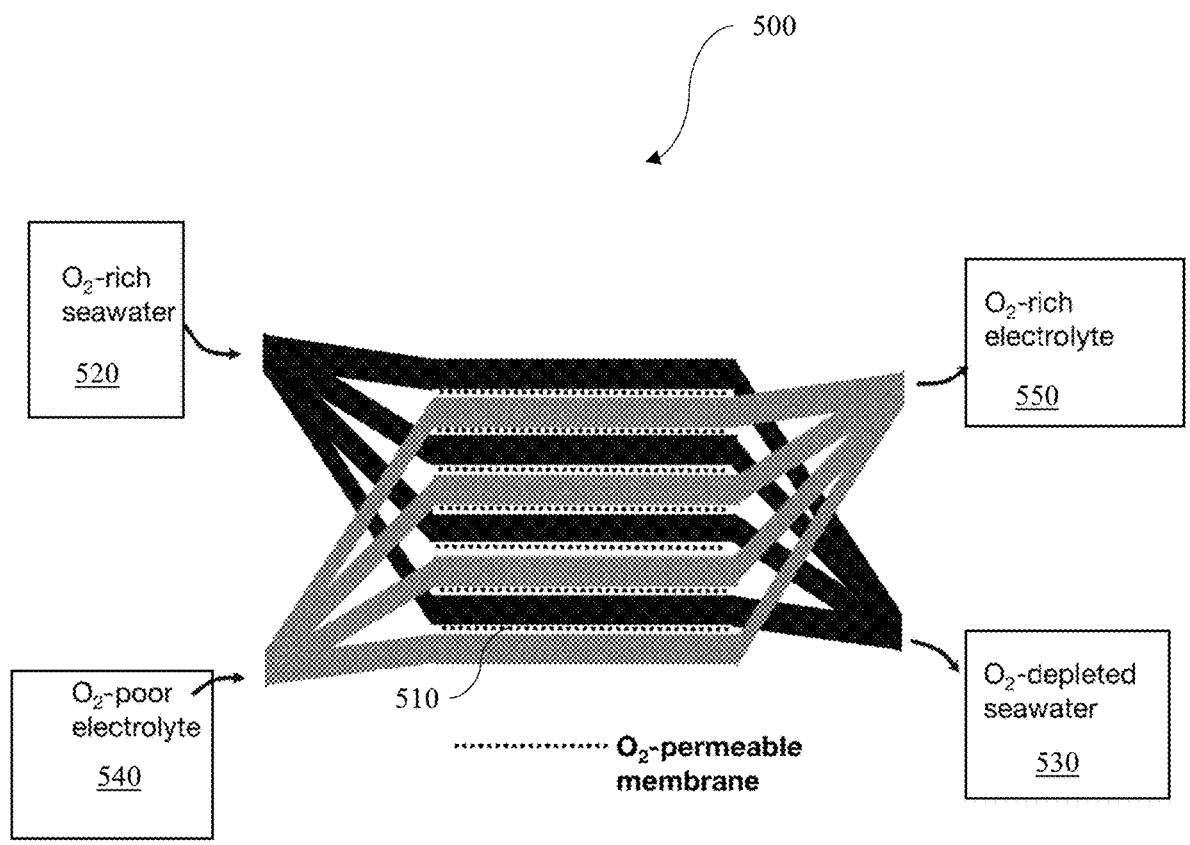
FIG. 5 is a schematic diagram of the gill subunit, in accordance with one embodiment.

FIG. 1 illustrates an aluminum-based battery 100 in accordance with one embodiment. In some embodiments, the battery 100 may use a selectively oxygen-permeable membrane 105 to extract $O_2$ 110 from the aqueous ambient environment and allow the $O_2$ to pass into the electrolyte 115. In some embodiments, this selectively oxygen-permeable membrane 105 may be a gill subunit and may use a plurality of filtration layers to extract $O_2$ 110 from the ambient environment. This 'gill' subunit, an embodiment of which is shown in FIG. 5, may be placed in the internal flow of electrolyte 115 on the battery 100. In some embodiments, other reactive metals (such as Li, Na, Mg, Zn, Al, or any combination of metals) thereof may be used as anodes in the battery 100. In some anodes, In, Ga, Sn, or Mn may be present in concentrations of less than 1% wt. In some embodiments, a lithium-aluminum alloy wherein the lithium comprises more than 1% wt may be used as anodes in the battery 100.

In some embodiments, the electrolyte 115 containing the extracted $O_2$ may be transported to the at least one electrochemical cell 120. In some embodiments, the electrolyte 115 may be transported to a plurality of electrochemical cells 120. In some embodiments, the electrolyte 115 within the system may be aqueous and alkaline. In some embodiments, the electrolyte may contain additional agents to facilitate the transport of $O_2$, such as an emulsion of perfluorocarbon liquids, such as perfluorooctyl bromide, perfluorodecyl bromide, other perfluoroalkyl bromides, 1H,1H,2H-perfluoro-1-hexene, perfluoro(methylcyclohexane), or redox shuttles containing the $Fe^{2+/3+}$, $Cr^{2+/3+}$, $Co^{2+/3+}$, $V^{2+/3+}$, $V^{4+/5+}$, or other redox centers, such as Fe(II) protoporphyrin IX, hemoglobin, or substituted viologen or quinone species. In some embodiments, the electrolyte may also contain additional agents to raise the pH of the electrolyte, including hydroxide compounds such as potassium hydroxide or sodium hydroxide. In other embodiments, the battery 100 may use barriers or selective ion exchange resins to filter salts, such as magnesium and calcium salts, from the aqueous ambient environment to preserve the alkalinity of the electrolyte. In some embodiments, the electrolyte may be sea water. In embodiments, the electrolyte may have a high pH. In embodiments, the electrolyte may be non-aqueous.

In embodiments, the electrolyte 115 may be transported to the at least one electrochemical cell 120. At the cell stack, two half-reactions may occur in some embodiments. At the anode, the half reaction may be:

$$M+3OH^-\rightarrow M(OH)_3+3e^-$$

wherein M represents a metal, such as aluminum in some embodiments. The number of hydroxide molecules used at the anode oxidation process per cycle is dependent upon the type of metal used. For a generalized metal M, the half reaction at the anode may be:

$$M+nOH^-\rightarrow M(OH)_n+ne^-$$

and a different amount of energy may be produced in the oxidation process. The anode gives up electrons to the external circuit.

In embodiments, the cathode half reaction may be:

$$\tfrac{3}{4}O_2+\tfrac{3}{2}H_2O+3e^-\rightarrow 3OH^-$$

wherein the $H_2O$ and $O_2$ are initially present in the electrolyte 115 and the electrons originate from the half reaction at the anode. In embodiments, the $O_2$ is co-reduced with $H_2O$ at the cathode. In embodiments, the ratio rate of reduction for $H_2O:O_2$ is 2:1.

The hydroxide may react with the anode at the at least one electrochemical cell 120 to produce waste in the form of a metal hydroxide, such as $Al(OH)_3$. In some embodiments, the $O_2$ in the electrolyte may react with the water at the cathode and the electrons produced at the anode of the at least one electrochemical cell 120 to produce hydroxide ions and an electrical current.

In embodiments, metal-hydroxide waste may be removed from the system through a waste removal system, such as a filter 125. In some embodiments, the filter is a semipermeable membrane or a porous membrane. In some embodiments, the filter is an ultrafiltration membrane or a nanofiltration membrane. In another embodiment, waste is removed in a settling chamber. In some embodiments, the waste is removed in precipitate form. In some embodiments, the waste is removed in crystallized form.

The waste removal system 125 can be placed in the internal flow of the electrolyte 115. In some embodiments, the waste removal system 125 can be placed between the selectively oxygen-permeable membrane 105 and the at least one electrochemical cell 120. In some embodiments, the electrolyte 115 may flow in a direction such that the electrolyte 115 may first pass by the selectively oxygen-permeable membrane 105 and then pass the waste removal system 125 before passing through the at least one electrochemical cell 120 of the battery 100. In some embodiments, the electrolyte 115 may flow in a direction such that the electrolyte 115 may first pass by the selectively oxygen-permeable membrane 105 and then pass through the at least one electrochemical cell 120 before passing through the waste removal system 125 of the battery 100.

Figure 7:
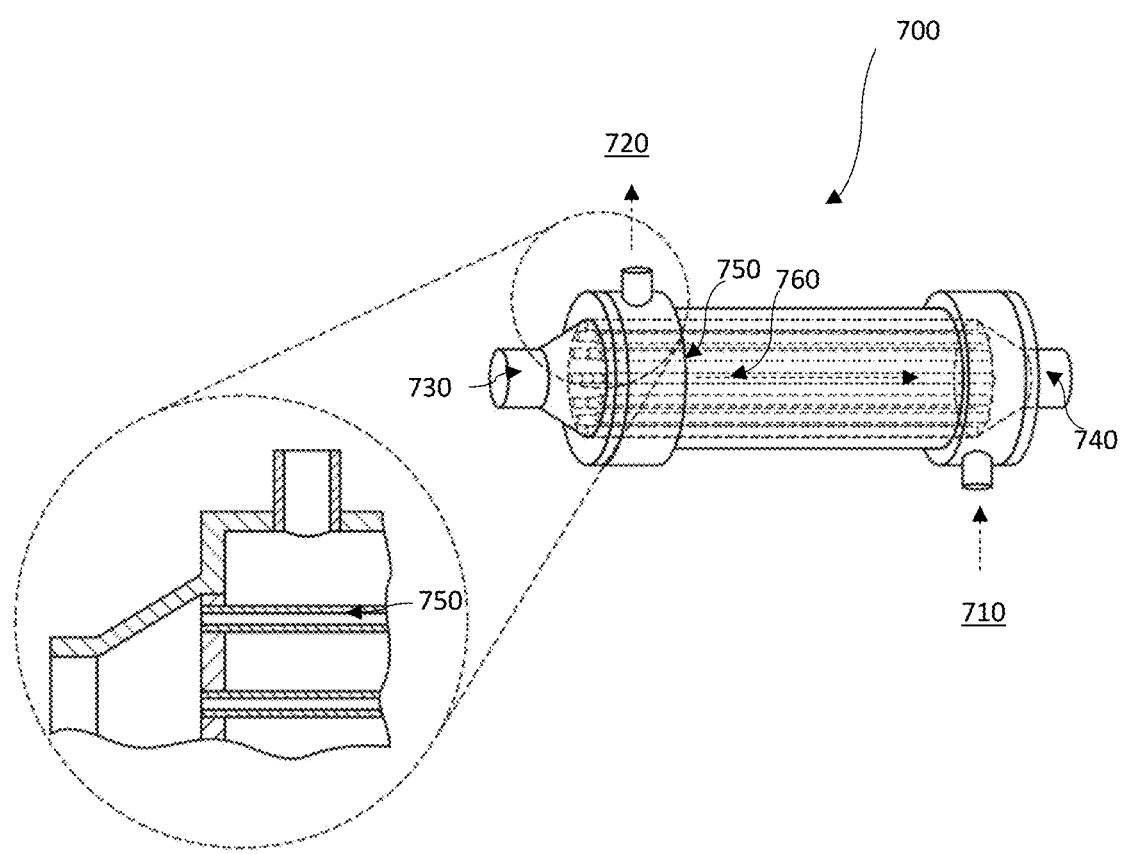
FIG. 7 is a schematic diagram of a counterflow gill subunit, in accordance with one embodiment.

In some embodiments, the electrolyte 115 may be contained within the battery 100. In embodiments, the selectively oxygen-permeable membrane 105 may be a selective membrane permeable to $O_2$ and may add additional $O_2$ to the electrolyte 115. To add $O_2$ to the electrolyte 115, embodiments may use an active counterflow $O_2$ exchange, as shown in FIG. 7 below. In embodiments, the only loss from the electrolyte 115 may be the filtered waste removed. In embodiments, both the waste removal 125 and the selectively oxygen-permeable membrane 105 may be equipped with at least one semi-permeable membrane. In embodiments, the membrane at the selectively oxygen-permeable membrane 105 may also be salt-selective, in that the selectively oxygen-permeable membrane 105 would not allow salts from the aqueous ambient environment to enter the electrolyte 115. In some embodiments, the membrane 105 may also be configured to prevent salt in the electrolyte 115 from leaving the electrolyte 115.

In some embodiments, the electrolyte 115 may contain agents to boost $O_2$ solubility. In some embodiments, the electrolyte 115 may contain perfluorocarbons, such as perfluorooctyl bromide, perfluorodecyl bromide, other perfluoroalkyl bromides, 1H,1H,2H-perfluoro-1-hexene, perfluoro (methylcyclohexane), or redox shuttles comprising $Fe^{2+/3+}$, $Cr^{2+/3+}$, $Co^{2+/3+}$, $V^{2+/3+}$, $V^{4+/5+}$, or other redox centers, such as Fe(II) protoporphyrin IX, hemoglobin, or substituted viologen or quinone species to boost $O_2$ solubility.

Figure 8:
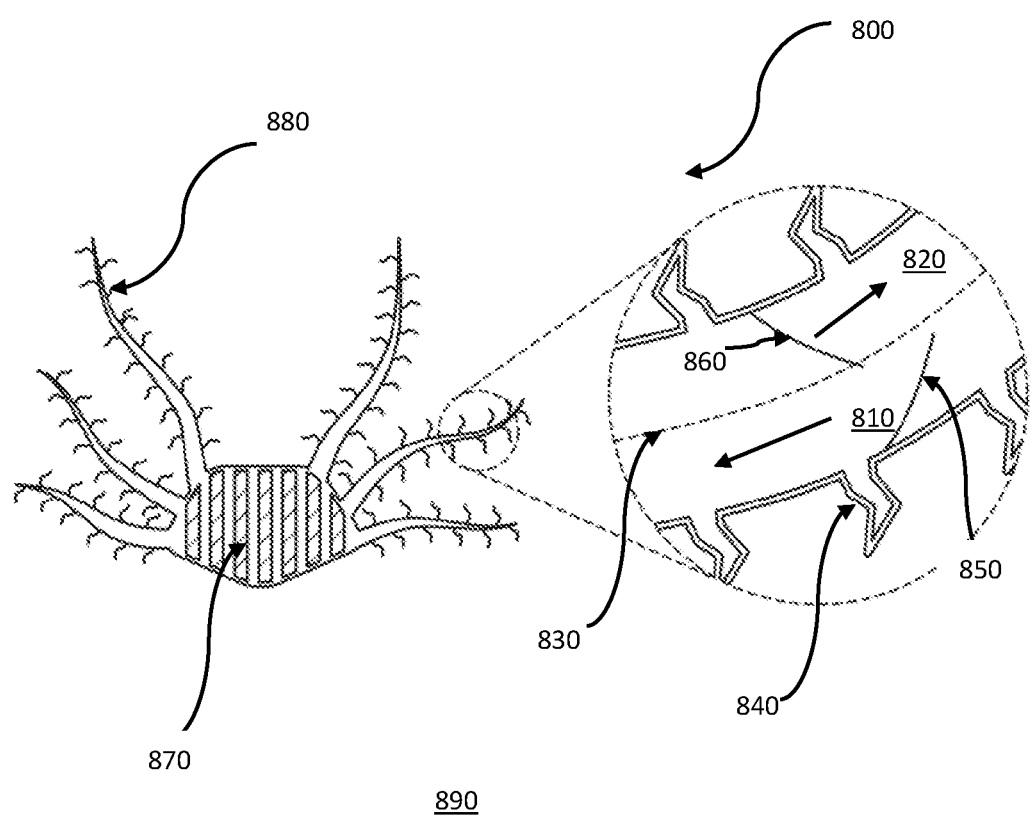
FIG. 8 is a schematic diagram of a passive-flow gill subunit, in accordance with one embodiment.

In embodiments, the electrolyte 115 may be transported actively through the battery 100. Flow over the membranes and filters 105, 125 of both the electrolyte 115 (internal to the system) and the ambient aqueous environment external to the battery 100 may be pumped by active mechanical means 160. In some embodiments, the active mechanical means 160 may be a pump. In some embodiments, the active mechanical means 160 may comprise at least one of a centrifugal, gear, lobe, diaphragm, peristaltic, or rotary vane pump. The electrolyte 115 may flow from the counterflow exchange at the selectively oxygen-permeable membrane 105. In embodiments, the electrolyte 115 may also flow under the influence of ocean currents or wave motion. In some embodiments, the electrolyte 115 may flow with the assistance of one-way valves, as shown in FIG. 8.

To increase the energy density of a battery 100, the battery 100 may reduce the extracted $O_2$ from the aqueous ambient environment rather than only the $H_2O$ itself. In some embodiments, reducing the extracted $O_2$ may offer approximately twice the attainable energy density of a battery reducing solely $H_2O$. In some embodiments, the battery 100 may switch to a system reducing only $H_2O$ instead of both $H_2O$ and $O_2$. This change may produce a higher power density for a short period of time in some embodiments, as a tradeoff for the higher energy density offered by the extracted $O_2$. In embodiments, reducing only $H_2O$ may be referred to as a "water breathing metabolism" because the battery 100 only reduces water. In embodiments, the selectively oxygen-permeable membrane 105 may not continue to actively supply $O_2$ to the electrolyte 115 when the battery 100 is set on this high-power density mode. This switch may occur if, for example, the load attached to the battery 100 requires more power than the membrane 105 can provide by filtering $O_2$ into the electrolyte 115.

Figure 2:
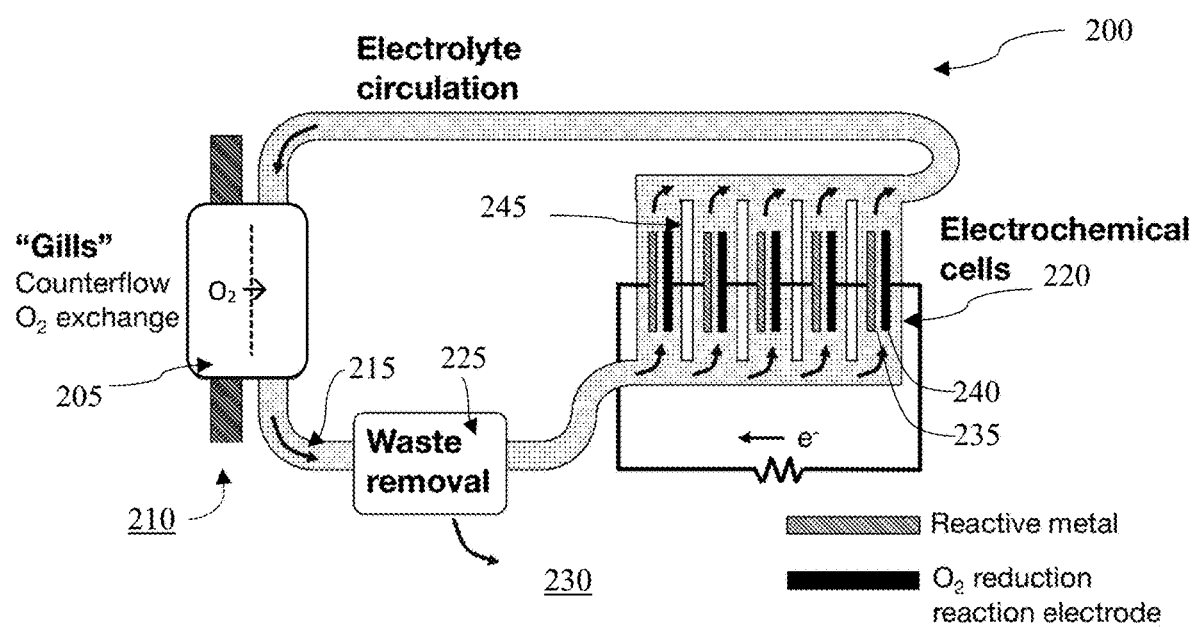
FIG. 2 is a schematic diagram of a metal-based battery system with a gill subunit having a plurality of electrochemical cells, wherein each chemical cell is arranged electrically in series and fluidically in parallel, in accordance with one embodiment.

FIG. 2 illustrates a schematic diagram of a metal-based battery system 200 with a gill subunit 205 having a plurality of electrochemical cells 220 wherein each chemical cell is arranged electrically in series and fluidically in parallel, in accordance with one embodiment. In some embodiments, the gill subunit 205 may comprise a selectively oxygen-permeable membrane. In some embodiments, the battery system 200 may use a gill subunit 205 having at least one selectively oxygen-permeable membrane to extract $O_2$ 210 from the aqueous ambient environment 230. In some embodiments, the aqueous ambient environment 230 is at least one of brackish water, salt water, sea water, or fresh water. In some embodiments, the gill subunit 205 may use a plurality of filtration layers to extract O2 210 from the ambient environment 230.

In some embodiments, the electrolyte 215 containing the extracted $O_2$ may be transported to at least one electrochemical cell or a plurality of electrochemical cells 220. In embodiments, waste may be removed from the system through a filter 225. The waste may be metal-hydroxide waste. In some embodiments, the filter is a semi-permeable membrane or a porous membrane. In some embodiments, the waste is removed in precipitate form. In some embodiments, the waste is removed in crystallized form.

The waste removal system 225 can be placed in the internal flow of the electrolyte 215. In some embodiments, the waste removal system 225 can be placed between the selectively oxygen-permeable membrane of the gill subunit 205 and the electrochemical cells 220. In some embodiments, the electrolyte 215 may flow in a direction such that the electrolyte 215 may first pass by the selectively oxygen-permeable membrane of the gill subunit 205 and then pass the waste removal system 225 before passing through the electrochemical cells 220 of the system 200. In some embodiments, the electrolyte 215 may flow in a direction such that the electrolyte 215 may first pass through the selectively oxygen-permeable membrane of the gill subunit 205 and then pass through the electrochemical cells 220 before passing through the waste removal system 225 of the battery system 200.

In some embodiments, the electrochemical cells 220 are arranged electrically in series and fluidically in parallel. The cells may be arranged such that the anode 235 of one cell is closer in proximity to the cathode 240 of the next cell than the anode 235 of the next cell. In some embodiments, a divider 245 may be placed between the individual cells 220. Although FIG. 2 shows a plurality of electrochemical cells 220 used in the battery system 200, embodiments may use only one electrochemical cell. The number of electrochemical cells 220 represented in the figure should not be interpreted as a maximum or minimum number of electrochemical cells 220 in other embodiments.

In some embodiments, the divider 245 may comprise polytetrafluoroethylene, nylon, polypropylene, polyamide, polyethylene, polyether ether ketone, polyethylene terephthalate, silicone, acrylonitrile butadiene styrene, polyvinyl chloride, polyvinyl difluoride, ethylene propylene diene monomer rubber, acrylonitrile butadiene rubber, or any combination thereof. The divider 245 may comprise a polymer chemically compatible with an alkaline electrolyte. In some embodiments, the divider 245 may comprise a material capable of being ultrasonically welded together with a cell housing (shown in FIG. 6).

In embodiments, the electrochemical cells 220 may be connected such that each cell has electrolyte 215 flowing around both the anode 235 and the cathode 240. In embodiments, the electrochemical cells 220 are connected fluidically in parallel, such that the electrolyte 215 may freely flow between the electrochemical cells 220 through the electrolyte circulation cycle. In embodiments, no electrochemical cell 220 may impede the flow of the electrolyte 215.

In embodiments, the reactive metal anode 235 may comprise Li, Na, Mg, Zn, Al, or any combination thereof. In some anodes, In, Ga, Sn, or Mn may be present in concentrations of less than 1 wt. %. In some embodiments, a lithium-aluminum alloy wherein the lithium comprises more than 1% wt may be used as anodes in the battery system 200. In some embodiments, the cathode 240 may comprise metallic oxides, such as manganese oxide, chromium oxide, copper oxide, or any combination thereof. In some embodiments, the cathode 240 may comprise Pt, Ir, Pd, Ni, Mo, Co, Fe, N, C, or any combinations thereof. In some embodiments, high specific surface area substrates of Ni, C, or stainless steel may be used as conductive catalyst supports.

Figure 3:
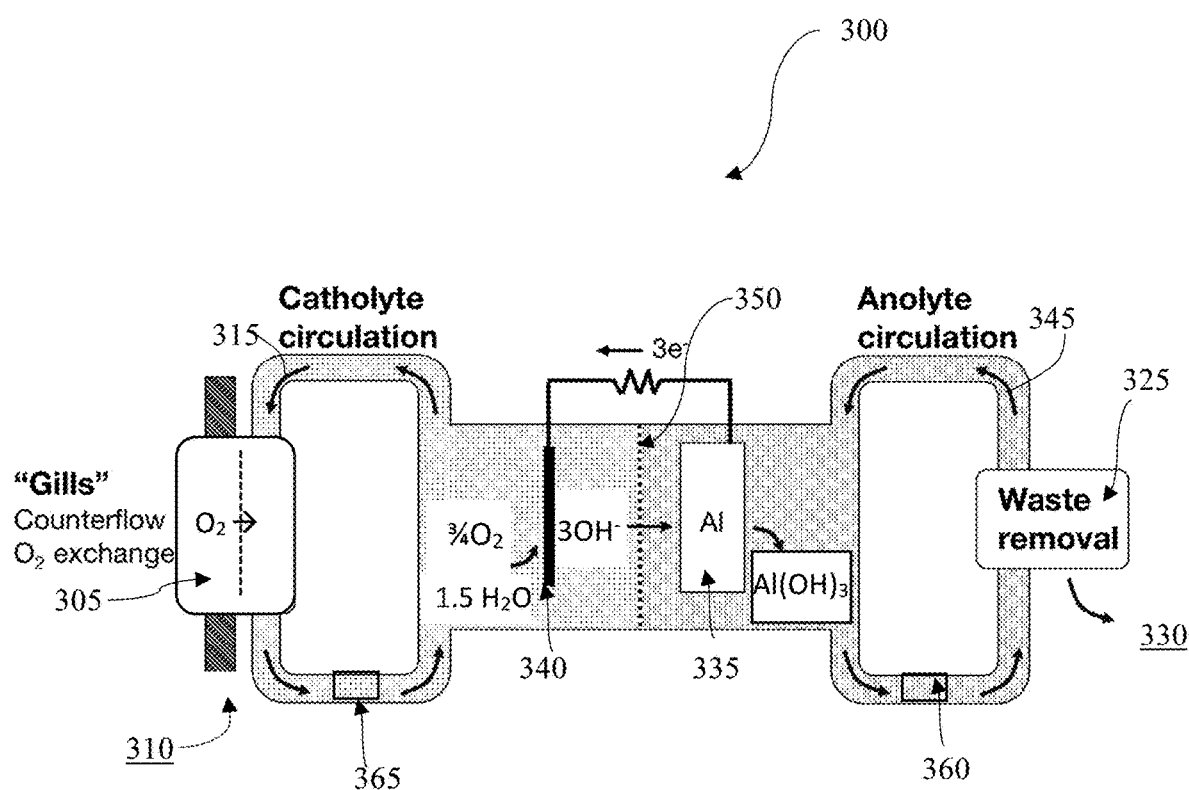
FIG. 3 is a schematic diagram of an aluminum-based water-activated battery with a gill subunit and separate anolyte and catholyte flow loops, in accordance with one embodiment.

FIG. 3 is a schematic diagram of an aluminum-based water-activated battery system 300 with a selectively oxygen-permeable membrane 305 and separate anolyte 345 and catholyte 315 flow loops, in accordance with one embodiment. In some embodiments, the battery system 300 may use a selectively oxygen-permeable membrane 305 to extract $O_2$ 310 from the aqueous ambient environment 330. In some embodiments, the aqueous ambient environment 330 is at least one of brackish water, salt water, sea water, or fresh water. In some embodiments, the selectively oxygen-permeable membrane 305 may be a gill subunit and may use a plurality of filtration layers to extract $O_2$ 310 from the ambient environment 330.

In some embodiments, the catholyte 315 may contain agents to boost $O_2$ solubility. In some embodiments, the catholyte 315 may contain perfluorocarbons, such as perfluorooctyl bromide, perfluorodecyl bromide, other perfluoroalkyl bromides, 1H,1H,2H-perfluoro-1-hexene, perfluoro (methylcyclohexane)), or redox shuttles comprising $Fe^{2+/3+}$, $Cr^{2+/3+}$, $Co^{2+/3+}$, $V^{2+/3+}$, $V^{4+/5+}$, or other redox centers, such as Fe(II) protoporphyrin IX, hemoglobin, or substituted viologen or quinone species to boost $O_2$ solubility.

In some embodiments, the catholyte 315 containing the extracted $O_2$ may be transported to the cathode 340, such that the cathode 340 is exposed to an oxygen-rich catholyte 315. In some embodiments, the catholyte 315 is separated from the anolyte 345 in the system 300 by an ion-conducting membrane 350. In some embodiments, the membrane 350 may comprise a ceramic material or glassy material, such as alumina, titania, zirconia oxides, silicon carbide, or any combination thereof. In some embodiments, the membrane 350 may comprise LISICON (lithium super ionic conductor) or NASICON (sodium (Na) super ionic conductor. The membrane 350 may be ion-selective and may only allow ions to pass from the catholyte 315 to the anolyte 345. In other embodiments, the membrane 350 may only allow ions to pass from the anolyte 345 to the catholyte. For example, in some embodiments, the half reaction at the cathode 340 may be $\frac{3}{4} O_2 + \frac{3}{2} H_2O + 3e^- \rightarrow 3OH^-$. In some embodiments, the half reaction at the anode 335 may be $M + 3OH^- \rightarrow M(OH)_3 + 3e^-$. The membrane 350 may be configured to conduct the hydroxide ions from the catholyte 315 to the anolyte 345 to facilitate the anode half-reaction. In some embodiments, the membrane 350 may also be salt-selective to reduce or prevent corrosion of the anode 335.

In some embodiments, the cathode 340, anode 335, catholyte 315, and anolyte 345 may all be chosen for their compatibility. In some embodiments, the anolyte 345 may be a fluorocarbon solvent or dimethyl carbonate. In some embodiments, the catholyte 315 may be non-aqueous, such as dimethyl sulfoxide, dimethyl carbonate, THF, or an ionic liquid. In some embodiments, a dimethyl carbonate anolyte 345 may be used with a Li anode 335 because the dimethyl carbonate anolyte 345 may be configured to transport $Li^+$ ions but may not be configured to transport sufficient $OH^-$ ions.

In some embodiments, both the catholyte 315 and the anolyte 345 may be water-based. The battery system 300 may be assembled with powdered substances contained in the anolyte 345 and/or catholyte 315 flow loops. The anolyte 345 and/or catholyte 315 flow loops may be connected to fill ports 360, 365. The fill ports 360, 365 may also contain semi-permeable membranes. If the system 300 is submerged in an ambient aqueous environment 330, the fill ports 360, 365 may fill the catholyte 315 and the anolyte 345 flow loops with water. The powders contained in the flow loops may then mix with the water to form the catholyte 315 and anolyte 345.

In embodiments, waste may be removed 325 from the system 300 through a filter to the ambient environment 330. The waste may be metal-hydroxide waste. In some embodiments, the filter is a semi-permeable membrane or porous membrane. In some embodiments, the waste may be removed in precipitate form. In some embodiments, the waste may be removed in crystallized form. Some embodiments may contain a plurality of waste removal systems 325, such that waste in the catholyte 315 that cannot be transported across the membrane 350 may be removed from the system 300. In some embodiments, waste in the catholyte 315 may be removed through the selectively oxygen-permeable membrane 305.

Figure 4:
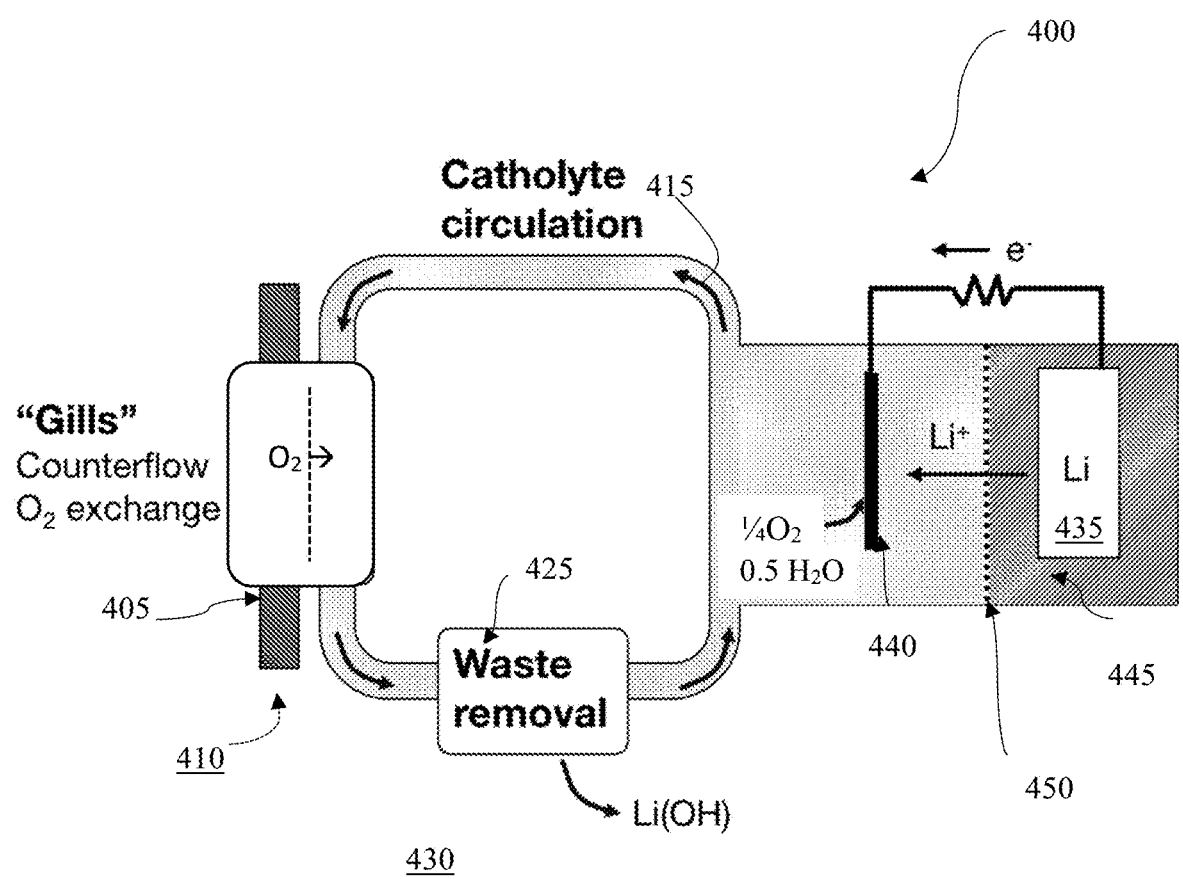
FIG. 4 is a schematic diagram of a lithium-based water-activated battery with a separate gill subunit, in accordance with one embodiment.

FIG. 4 is a schematic diagram of a lithium-based water-activated battery system 400 with a selectively oxygen-permeable membrane 405, in accordance with one embodiment. In some embodiments, the selectively oxygen-permeable membrane 405 may be a gill subunit. In some embodiments, the battery system 400 may have separate anolyte 445 and catholyte 415 flow loops, separated by an ion-conducting membrane 450. In some embodiments, the battery system 400 may use a selectively oxygen-permeable membrane 405 to extract $O_2$ 410 from the aqueous ambient environment 430. In some embodiments, the aqueous ambient environment 430 is at least one of brackish water, salt water, sea water, or fresh water. In some embodiments, the selectively oxygen-permeable membrane 405 may be a gill subunit and may use a plurality of filtration layers to extract $O_2$ 410 from the ambient environment 430. In some embodiments, the membrane 405 may use counterflow to extract $O_2$ 410 from the ambient environment 430.

In some embodiments, Li is used as the anode 435. In some embodiments, the anode 435 may comprise Al, Li, Na, Mg. Zn, or any combination thereof. The cathode 440 may comprise materials stable at potentials up to 1.3 V with respect to a reversible hydrogen electrode (RHE). The cathode 440 may also comprise materials that are catalytically active for oxygen reduction reactions, hydrogen evolution reactions, or both oxygen reduction reactions and hydrogen evolution reactions in some embodiments. In some embodiments, the cathode 440 may comprise Pt, Ir, Pd, Ni, Mo, Co, Fe, N, C, or any combinations thereof. In some embodiments, high specific surface area substrates of Ni, C, or stainless steel may be used as conductive catalyst supports. In embodiments where the anode 435 comprises Li, the half-reaction at the anode 435 may produce lithium ions. The membrane 450 may be an ion-conducting membrane and may transport the lithium ions from the anolyte 445 to the catholyte 415. In some embodiments, the membrane 450 may be semi-permeable and may be salt-selective.

In embodiments, waste may be removed from the battery system 400 through a filter 425 to the ambient environment 430. The waste may comprise metal hydroxide. In some embodiments, the filter 425 is a semi-permeable membrane or a porous membrane. In some embodiments, the waste may be removed in precipitate form. In some embodiments, the waste may be removed in crystallized form. Some embodiments may contain a plurality of waste removal systems 425, such that waste in the catholyte 415 that cannot be transported across the membrane 450 may be removed from the system 400. In some embodiments, waste in the catholyte 415 may be removed through the selectively oxygen-permeable membrane 405. In some embodiments, a waste removal system 425 may be present to filter the anolyte 445.

FIG. 5 is a schematic diagram of the gill subunit 500, in accordance with one embodiment. In some embodiments, the gill subunit 500 may contain a plurality of $O_2$ permeable membranes 510. The $O_2$-rich seawater 520 may pass through or over the $O_2$-permeable membranes 510. In the process, the $O_2$-permeable membranes 510 may extract $O_2$ from the $O_2$-rich seawater 520 and the extracted $O_2$ may enrich the electrolyte 540 to form an $O_2$-rich electrolyte 550. In some embodiments, the gill subunit 500 only enriches a catholyte with $O_2$. The gill subunit 500 may extract $O_2$ through counterflow. In some embodiments, the gill subunit 500 may extract $O_2$ from fresh water, brackish water, or another ambient aqueous environment.

In some embodiments, a battery having the gill subunit 500 may be assembled with the membranes 510 in a folded or otherwise collapsed configuration. Upon submersion of the gill subunit 500 in an aqueous ambient environment, the gill subunit 500 may expand. In embodiments, the gill subunit 500 may expand to up to 10 times its initial volume to facilitate exchange of $O_2$ between the battery electrolyte and the aqueous ambient environment. In some embodiments, the gill subunit 500 may expand up to 100 times its initial volume. In some embodiments, the gill subunit 500 may expand up to 1,000 times its initial volume.

Figure 6A:
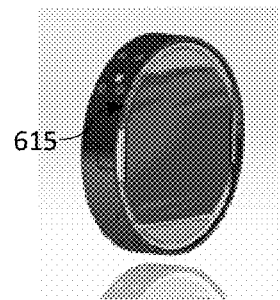
FIG. 6A is a schematic diagram of an individual cell in a pre-deployed configuration, in accordance with one embodiment.
Figures 6B, 6C:
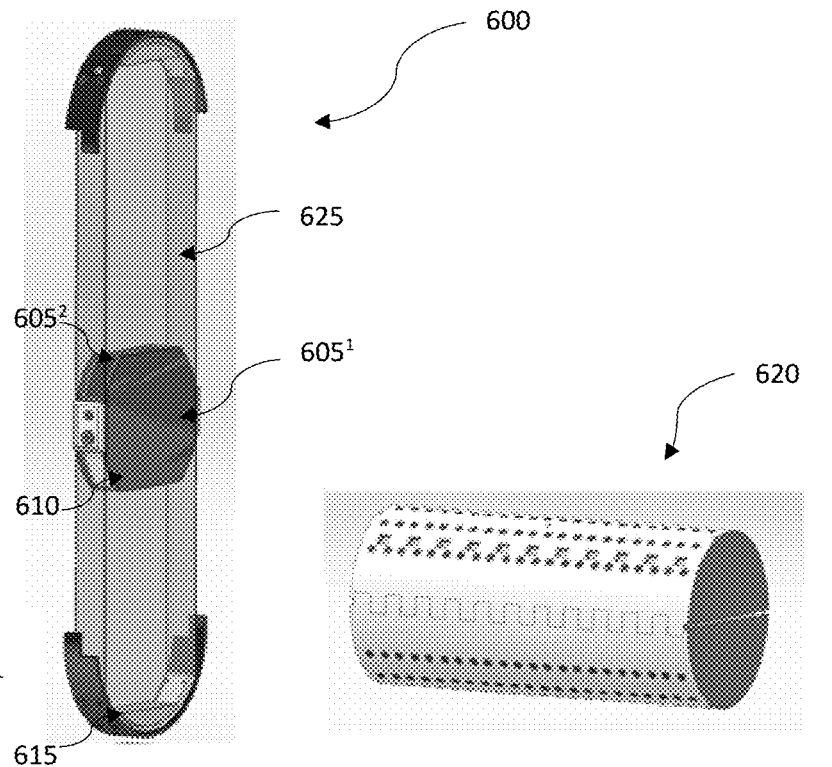
FIG. 6B is a schematic diagram of an individual cell in a deployed configuration, in accordance with one embodiment.
FIG. 6C is a cell stack in a pre-deployed configuration, in accordance with one embodiment.

FIG. 6A is a schematic diagram of an individual cell 600 in a pre-deployed configuration, in accordance with one embodiment. FIG. 6B is a schematic diagram of an individual cell 600 in a deployed configuration, in accordance with one embodiment. In some embodiments, the cell 600 has at least one cathode 605$^1$. In some embodiments, the cell 600 has two cathodes 605$^1$, 605$^2$. The cell 600 may have an anode 610 placed between the cathodes 605$^1$, 605$^2$ and an outer housing 615 to contain the electrolyte 625. The electrolyte 625 may also be encased in an inner housing made of an insulating material, such as plastic. In other embodiments, the inner housing further comprises a semi-permeable membrane 630 to allow $O_2$ to permeate through the electrolyte 625 and between cells 600.

Figure 6D:
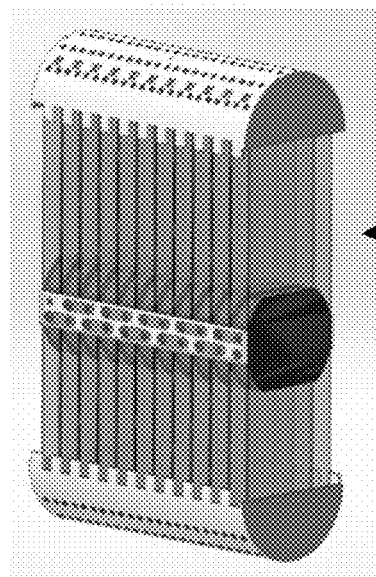
FIG. 6D is a cell stack in a deployed configuration, in accordance with one embodiment.

FIG. 6C is a cell stack 620 in a pre-deployed configuration, in accordance with one embodiment. FIG. 6D is a cell stack 620 in a deployed configuration, in accordance with one embodiment. The individual cells 600 may be arranged in a cell stack 620. In some embodiments, the cells 600 may have semi-permeable membranes 630 to allow $O_2$ to pass from the ambient aqueous environment to the electrolyte 625. In some embodiments, the $O_2$ is transported passively from the environment to the electrolyte. The membrane 630 may also be salt-selective and may not allow salt to pass from the ambient environment to the electrolyte 625.

In some embodiments, the cell stack 620 may be used as a static cell configuration and may allow $O_2$ to be transported passively, such as by wave movement, into the electrolyte 625.

In some embodiments, the cell stack 620 may begin in a pre-deployed configuration such that any significant gaps between the anode 610 and the cathode(s) 605$^1$, 605$^2$ are initially removed. In some embodiments, the cell stack 620 may expand during a cell startup phase or may, alternatively, expand during cell operation. The pre-deployed configuration shown in FIG. 6C may be several times less voluminous than the deployed configuration shown in FIG. 6D and, thus, may save space upon transport of the cell stack 620.

FIG. 7 is a schematic diagram of a counterflow gill subunit 700, in accordance with one embodiment. In some embodiments, the gill subunit 700 has an inlet 710 for fluid to enter and pass through the subunit 700. In embodiments, this fluid may be the ambient aqueous environment and may comprise ocean water, seawater, brackish water, or fresh water. In some embodiments, the counterflow gill subunit 700 may have an outlet 720 for the fluid to exit from the subunit 700. When the fluid passes through the gill subunit 700, the fluid may pass around at least one membrane tube 750. In embodiments, the membrane tube 750 may contain electrolyte. The electrolyte may flow in a direction 760 through the inlet 730, through the tubes 750, and towards the outlet 740.

In some embodiments, the membrane tubes 750 may be semi-permeable and may be permeable to $O_2$. The membrane tubes may not be permeable to salt in some embodiments. The membrane tubes 750 may facilitate extraction of $O_2$ from the fluid entering from the inlet 710 and may enrich the electrolyte flowing through the membrane tube 750 with $O_2$. The enriched electrolyte may then flow from outlet 740 towards a cathode. In some embodiments, the fluid depleted from $O_2$ may then pass through the outlet 720.

FIG. 8 is a schematic diagram of a passive-flow gill subunit 800, in accordance with one embodiment. In some embodiments, the $O_2$-rich aqueous ambient environment 890 may surround the subunit 800. Through passive movement of the ambient aqueous environment 890, such as wave movement, the ambient environment 890 may contact the membrane 840 of the subunit 800. In some embodiments, the membrane 840 may be a selectively $O_2$-permeable membrane and may allow $O_2$ to pass through the membrane 840 and into the electrolyte 810. In some embodiments, the electrolyte 810 may then be transported to the electrochemical cells 870. In some embodiments, the membrane 840 is flexible, such that flexible filaments 880 surround the electrochemical cells 870. In some embodiments, the flexibility of the membrane 840 enables the one-way valves 850, 860 to convert movement of the ambient environment 890, including ocean currents, waves, and hydroelastic flutter, into circulation of the electrolyte 810.

In some embodiments, the $O_2$-rich electrolyte 810 may be transported to the electrochemical cells 870. The electrochemical cells may use the $O_2$ to generate power. In some embodiments, once the electrochemical cells 870 generate power, the cells 870 may deplete the electrolyte 810 of $O_2$. In some embodiments, the depleted electrolyte 820 may then be transported to the membrane filaments 880 to be replenished with $O_2$ from the ambient environment 890. In some embodiments, the depleted electrolyte 820 may be separated from the $O_2$-rich electrolyte by a membrane 830 or other divider. In some embodiments, the filaments 880 may expand in contact with an aqueous ambient environment 890. In some embodiments, the membrane 840 may be impermeable to salt.

One-way valve 850 may help prevent the oxygen-enriched electrolyte 810 from flowing away from the electrochemical cells 870. The one-way valve 850 may enable a forward ocean current to propel the oxygen-enriched electrolyte 810 to flow towards the electrochemical cells 870, and the valve 850 may stop a backward flowing ocean current from propelling the oxygen-enriched electrolyte away from the electrochemical cells in some embodiments. Similarly, one-way valve 860 may help prevent the oxygen-depleted electrolyte 820 from flowing towards the electrochemical cells 870. One-way valve 860 may enable a backwards ocean current to propel the oxygen-depleted electrolyte 820 away from the electrochemical cells 870, and the valve 860 may stop a forward flowing ocean current from propelling the oxygen-depleted electrolyte 820 towards the electrochemical cells 870.

Figure 9:
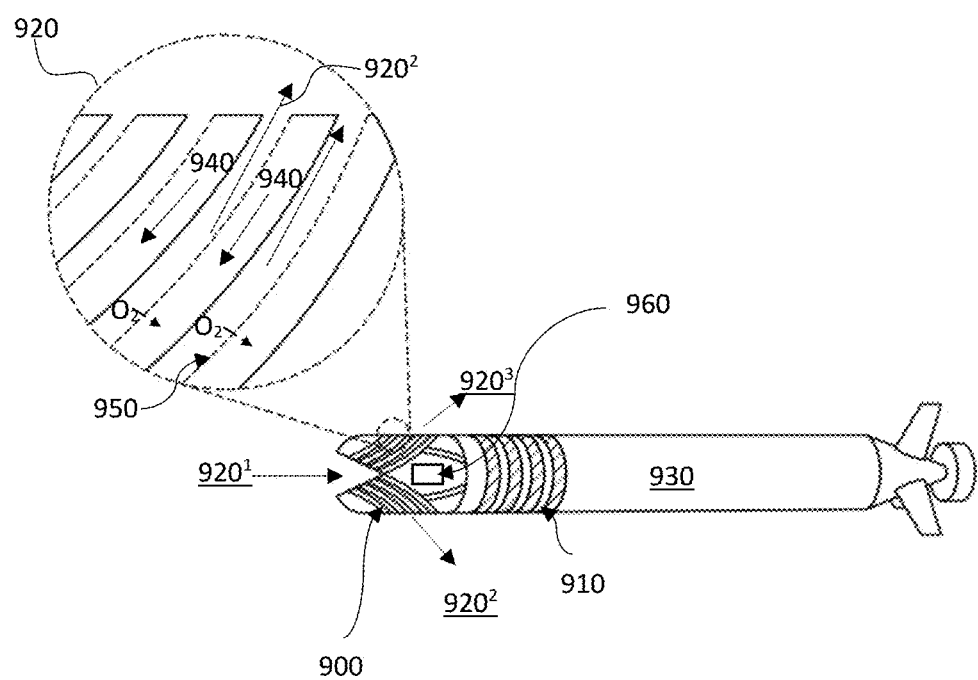
FIG. 9 is a schematic diagram of a ram ventilation gill subunit, in accordance with one embodiment.

FIG. 9 is a schematic diagram of a ram ventilation gill subunit 900, in accordance with one embodiment. Ram ventilation is used by some fish, such that water flows through the mouth of the fish and across the gills when the fish is swimming forward. Similarly, during forward propulsion of a unit 930 comprising a gill subunit 900 and electrochemical cells 910, the aqueous environment 920 may flow through the gill subunit 900. In some embodiments, the $O_2$-rich aqueous environment $920^1$ may enter the gill subunit 900 and may leave as an $O_2$-depleted fluid $920^2$, $920^3$ through different sides of the gill subunit 900.

In some embodiments, the gill subunit 900 may comprise a semi-permeable membrane 950, wherein the membrane is permeable to $O_2$. In some embodiments, the membrane 950 may be selectively impermeable to salt. When the unit 930 moves forward, the aqueous environment 920 may pass through the gill subunit 900. In some embodiments, $O_2$ from the ambient environment 920 may pass through the membrane 950 and enrich the electrolyte. The enriched electrolyte 940 may then be propelled to the electrochemical cells 910 to supply the cells with $O_2$.

In some embodiments, $O_2$ may flow through the membrane 950 at a rate of at least 0.1 $ng/cm^2/min$. In some embodiments, $O_2$ may flow through the membrane 950 at a rate of at least 1 $ng/cm^2/min$. In some embodiments, $O_2$ may flow through the membrane 950 at a rate of at least 10 $ng/cm^2/min$. In some embodiments, $O_2$ may flow through the membrane 950 at a rate of at least 0.1 $\mu g/cm^2/min$. In some embodiments, $O_2$ may flow through the membrane 950 at a rate of at least 0.5 $\mu g/cm^2/min$. In some embodiments, $O_2$ may flow through the membrane 950 at a rate of at least 1 $\mu g/cm^2/min$. In some embodiments, $O_2$ may flow through the membrane 950 at a rate of at least 10 $\mu g/cm^2/min$. In some embodiments, $O_2$ may flow through the membrane 950 at a rate of at least 100 $\mu g/cm^2/min$. In some embodiments, $O_2$ may flow through the membrane 950 at a rate of at least 1 $mg/cm^2/min$. In some embodiments, $O_2$ may flow through the membrane 950 at a rate of at most 0.1 $ng/cm^2/min$. In some embodiments, $O_2$ may flow through the membrane 950 at a rate of at most 1 $ng/cm^2/min$. In some embodiments, $O_2$ may flow through the membrane 950 at a rate of at most 10 $ng/cm^2/min$. In some embodiments, $O_2$ may flow through the membrane 950 at a rate of at most 0.1 $\mu g/cm^2/min$. In some embodiments, $O_2$ may flow through the membrane 950 at a rate of at most 0.5 $\mu g/cm^2/min$. In some embodiments, $O_2$ may flow through the membrane 950 at a rate of at most 1 $\mu g/cm^2/min$. In some embodiments, $O_2$ may flow through the membrane 950 at a rate of at most 10 $\mu g/cm^2/min$. In some embodiments, $O_2$ may flow through the membrane 950 at a rate of at most 100 $\mu g/cm^2/min$. In some embodiments, $O_2$ may flow through the membrane 950 at a rate of at most 1 $mg/cm^2/min$.

In some embodiments, $O_2$ flow rates may vary based on ambient environment 920 temperature. Both flow configuration and temperature of the ambient environment may affect the diffusion rate of $O_2$. For example, the directional flow configuration, such as a cross-flow, parallel flow, or counter-flow may affect the flow rate of $O_2$ through the membrane 950. In some embodiments, cross-flow or counter-flow will draw more $O_2$ through the membrane 950 than parallel flow. In embodiments, the solubility of $O_2$ in the electrolyte 940 may increase as the temperature of the electrolyte 940 decreases.

In embodiments, the total surface area of the membrane 950 may be adjusted to control the flow rate of $O_2$ through the membrane 950. For example, in some embodiments, gills may be expanded or contracted to increase or decrease the total surface area of the membrane 950 exposed to the ambient environment 920 (shown in FIG. 6).

In some embodiments, the flow rate of $O_2$ through the membrane 950 may depend on the type of membrane 950 used in the subunit 900. In embodiments utilizing a dense solid polymer membrane 950, wherein the membrane has no pores of appreciable diameter, $O_2$ may adsorb into the polymer matrix of the membrane 950, diffuse through the polymer matrix along the concentration gradient, and then desorb into the electrolyte 940. In some embodiments, $O_2$ may desorb into a catholyte separate from the anolyte (shown in FIG. 4). In embodiments, the diffusion coefficient of $O_2$ in the polymer membrane 950 may vary based on the polymer material selected.

In some embodiments, the membrane 950 may comprise a small-pore propylene membrane comprising small, fixed pores physically traversing the thickness of the membrane. In a small-pore propylene membrane, capillary forces and hydrophobic surface interactions may act as a barrier to $H_2O$ and allow small, non-polar molecules such as $O_2$ to pass through the membrane. In some embodiments, the $O_2$ transfer rate may depend on the physical configuration of the hydrophobic small-pore membrane. Physical configuration may include the porosity and pore size distribution within the membrane 950. In some embodiments, the membrane 950 may comprise a mixture of dense solid polymer membranes and small-pore propylene membranes.

In some embodiments, the unit 930 may comprise a tank of perfluorocarbons (PFCs) 960. In some embodiments, the tank 960 may have a controlled release valve for the PFCs such that the PFCs could be released slowly or quickly into the electrolyte 940. In some embodiments, the PFCs may increase the amount of $O_2$ absorbed into the electrolyte 940.

In some embodiments, the rate of diffusion of $O_2$ may be proportional to the concentration difference across the membrane 950. In some embodiments, the speed of the unit 930 may be increased to direct the unit 930 to an ambient environment 920 having more dissolved oxygen. In some embodiments, the pump flow rate of the electrolyte 940 may change with the speed of the unit 930. In some embodiments, the residence time of the ambient environment 920 in the gill may affect the $O_2$ concentration in the electrolyte 940. For example, at a low speed, the unit 930 may have a low flow rate of a highly oxygenated electrolyte 940 because the aqueous environment 920 resided in the gill subunit 900 for an extended period of time and thus, more $O_2$ permeated through the membrane of the gill subunit 900. Conversely, at a high speed, the unit 930 may have a high flow rate of a moderately-oxygenated electrolyte 940 because the aqueous environment 920 resided in the gill subunit 900 for a shorter period of time.

Figure 10:
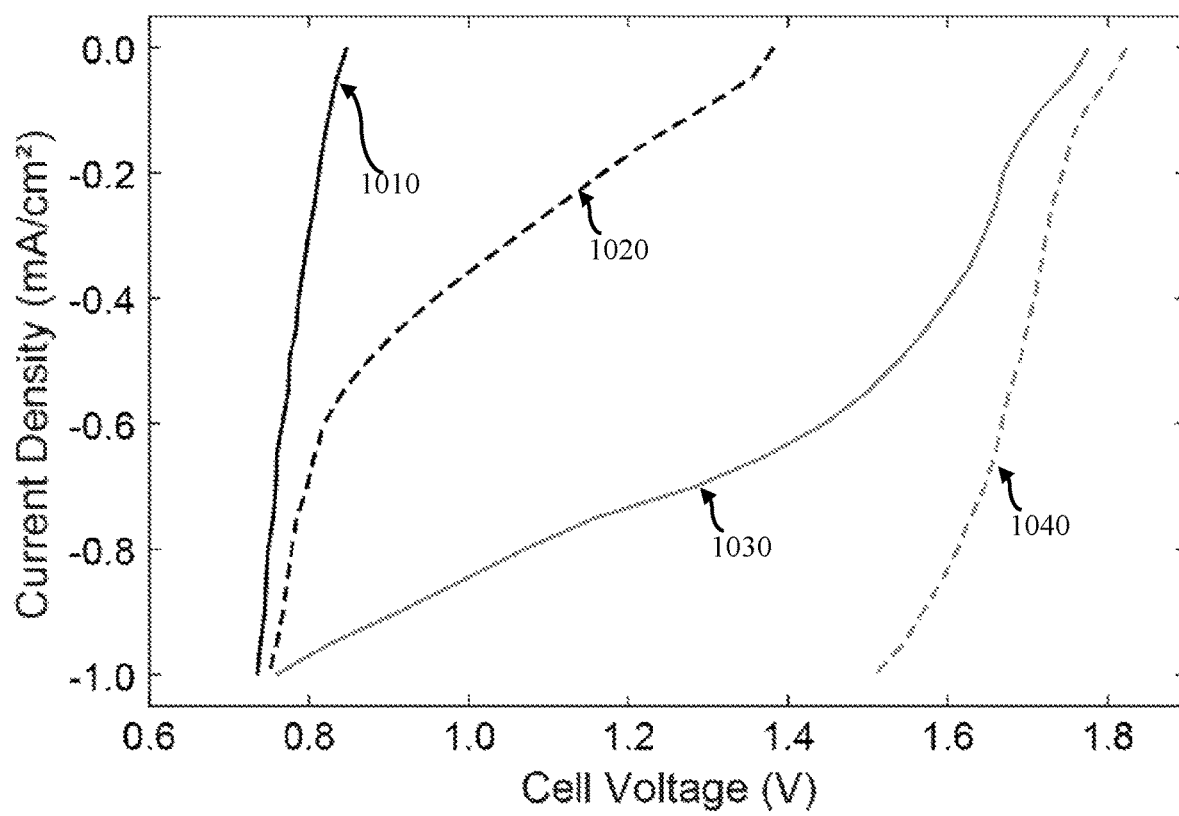
FIG. 10 is a graphical comparison of the cell voltages of a metal-dissolved oxygen cell having a de-oxygenated electrolyte, a partially-oxygenated electrolyte, a fully-oxygenated electrolyte, and a fully-oxygenated electrolyte with perfluorocarbons, in accordance with one embodiment.

FIG. 10 is a graphical comparison of the cell voltages of a metal-dissolved oxygen cell having a de-oxygenated electrolyte 1010, a partially-oxygenated electrolyte 1020, a fully-oxygenated electrolyte 1030, and a fully-oxygenated electrolyte with perfluorocarbons 1040, in accordance with one embodiment.

The de-oxygenated electrolyte 1010 current-voltage chart tracks an electrolyte 1010 flushed with a pure $N_2$ gas environment to remove $O_2$. The partially-oxygenated electrolyte 1020 current-voltage chart tracks an electrolyte 1020 held in an ambient atmospheric gas environment comprising approximately 79% $N_2$ and 21% $O_2$. The fully-oxygenated electrolyte 1030 current-voltage chart tracks an electrolyte 1030 held in an ambient pure $O_2$ gas environment. The fully-oxygenated electrolyte with perfluorocarbons 1040 current-voltage chart tracks a 90%-10% electrolyte-perfluorocarbon mixture 1040 held in an ambient pure $O_2$ gas environment.

When current (mA) was initially applied to the cell having partially-oxygenated, non-enriched electrolyte 1020, the electrolyte 1020 in cell was not completely void of $O_2$. During experimental procedures, the electrolyte may be opened to atmospheric conditions in some embodiments, which results in a small $O_2$ concentration initially present in the partially-oxygenated, non-enriched electrolyte 1020. Through Henry's law, the initial concentration of $O_2$ of the electrolytes 1010, 1020 at room temperature is approximately 7 ppm in some embodiments. The fully-oxygenated electrolyte 1030 has a concentration of approximately 20-22 ppm.

As the current increased to approximately 0.6 mA, the cell having a partially-oxygenated, non-enriched electrolyte 1020 reduced the $O_2$ initially present in the electrolyte and began to reduce $H_2O$ at the cathode. The curve at 0.6 mA for the standard electrolyte 1020 demonstrates that the $O_2$ was exhausted and the fraction of $H_2O$ reduced at the cathode increased. As shown by FIG. 10, fully-oxygenated electrolyte cells, enriched with dissolved $O_2$, have a higher cell potential than non-enriched cells in some embodiments. At 0.6 mA, the fully-oxygenated electrolyte 1030, 1040 cells have a higher cell potential than the non-enriched and partially-enriched cells at 0.0 mA. This greater potential indicates that the cathode is reducing $O_2$. While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of generating an electrical current comprising:
    extracting oxygen from an aqueous ambient environment surrounding an electrochemical system;
    transporting the oxygen through a selectively oxygen-permeable membrane to an enclosed electrolyte configured to surround an anode and a cathode in the electrochemical system, wherein the enclosed electrolyte is separated from the aqueous ambient environment;
    transporting the enclosed electrolyte to the cathode;
    reducing the oxygen at the cathode; and
    oxidizing a metal at the anode.

2. The method of claim 1 wherein the enclosed electrolyte has a pH above 7.40.

3. The method of claim 1, further comprising extracting metal-hydroxide waste from the enclosed electrolyte.

4. The method of claim 1 wherein a pump actively transports the enclosed electrolyte to the cathode.

5. The method of claim 1 wherein the enclosed electrolyte is passively transported to the cathode.

6. The method of claim 1 wherein the selectively oxygen-permeable membrane is salt-selective.

7. The method of claim 1 wherein the electrochemical system comprises a second selectively oxygen-permeable membrane.

8. The method of claim 1 wherein the anode comprises at least one of Li, Mg, Na, Zn, and Al.

9. The method of claim 1 wherein the aqueous ambient environment comprises seawater.

10. A multi-cell metal-dissolved oxygen electrochemical device comprising:
    a metal anode;
    a cathode;
    an enclosed electrolyte configured to surround the cathode and the anode, wherein the enclosed electrolyte is separated from an aqueous ambient environment surrounding the electrochemical device; and
    a selectively oxygen-permeable membrane configured to extract oxygen from the aqueous ambient environment;
    wherein the electrochemical device is configured to:
        transport the oxygen to the enclosed electrolyte;
        transport the enclosed electrolyte to the cathode;
        reduce the oxygen at the cathode;
        oxidize a metal at the metal anode; and
        generate an electrical current.

11. The multi-cell metal-dissolved oxygen electrochemical device of claim 10 wherein the enclosed electrolyte has a pH above 7.40.

12. The multi-cell metal-dissolved oxygen electrochemical device of claim 10 further comprising a pump configured to actively transport the enclosed electrolyte to the cathode.

13. The multi-cell metal-dissolved oxygen electrochemical device of claim 10 wherein the enclosed electrolyte is passively transported to the cathode.

14. The multi-cell metal-dissolved oxygen electrochemical device of claim 10 wherein the selectively oxygen-permeable membrane is salt-selective.

15. The multi-cell metal-dissolved oxygen electrochemical device of claim 10 further comprising a second selectively oxygen-permeable membrane.

16. The multi-cell metal-dissolved oxygen electrochemical device of claim 10 wherein the anode comprises at least one of Li, Mg, Na, Zn, and Al.

17. The multi-cell metal-dissolved oxygen electrochemical device of claim 10 wherein the aqueous ambient environment comprises seawater.

18. The multi-cell metal-dissolved oxygen electrochemical device of claim 10 wherein the multi-cell metal-dissolved oxygen electrochemical device has cells and the cells are arranged electrically in series.

19. The multi-cell metal-dissolved oxygen electrochemical device of claim 10 wherein the multi-cell metal-dissolved oxygen electrochemical device has cells and the cells are arranged fluidically in parallel.

20. A multi-cell electrochemical device comprising:
    a metal anode;
    a cathode;
    an enclosed electrolyte configured to surround the cathode and the anode, wherein:
        the enclosed electrolyte is separated from an aqueous ambient environment surrounding the electrochemical device; and
        the enclosed electrolyte comprises an anolyte and a catholyte;
    a selectively oxygen-permeable membrane configured to extract oxygen from the aqueous ambient environment; and
    an anolyte flow loop separate from a catholyte flow loop;
    wherein the electrochemical device is configured to:
        transport the oxygen to the catholyte;
        transport the catholyte to the cathode;
        reduce the oxygen at the cathode;
        oxidize a metal at the metal anode; and
        generate an electrical current.

* * * * *